United States Patent
Yang

(10) Patent No.: US 7,369,350 B2
(45) Date of Patent: May 6, 2008

(54) POWER PROTECTION FOR VCM CONTROL LOOP IN HARD DISK DRIVE SERVO IC

(75) Inventor: Jinyu Yang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/586,365

(22) Filed: Oct. 25, 2006

(65) Prior Publication Data

US 2007/0091501 A1    Apr. 26, 2007

Related U.S. Application Data

(60) Provisional application No. 60/729,823, filed on Oct. 25, 2005.

(51) Int. Cl.
*G11B 21/02* (2006.01)

(52) U.S. Cl. .................................................... 360/75

(58) Field of Classification Search .................. 360/75, 360/69, 46
See application file for complete search history.

(56) References Cited

U.S. PATENT DOCUMENTS

| | | | | |
|---|---|---|---|---|
| 4,200,827 A | * | 4/1980 | Oswald | 318/561 |
| 6,549,359 B1 | * | 4/2003 | Bennett et al. | 360/69 |
| 6,549,361 B1 | * | 4/2003 | Bennett et al. | 360/75 |
| 6,574,062 B1 | * | 6/2003 | Bennett et al. | 360/69 |
| 6,577,465 B1 | * | 6/2003 | Bennett et al. | 360/69 |
| 7,092,197 B2 | * | 8/2006 | El-Sherif et al. | 360/75 |

* cited by examiner

*Primary Examiner*—Fred F. Tzeng
(74) *Attorney, Agent, or Firm*—Wade J. Brady, III; Frederick J. Telecky, Jr.

(57) ABSTRACT

A VCM power protection circuit that limits the maximum voltage that can occur across any of the VCM's output FETs, while at the same time providing some bias on a VCM output to direct a head toward a landing zone during power-up or any time there is a higher than normal voltage on the power supply.

16 Claims, 2 Drawing Sheets

POWER PROTECTION FOR VCM CONTROL LOOP IN HARD DISK DRIVE SERVO IC

CLAIM OF PRIORITY

This application claims priority of U.S. Provisional patent application Ser. No. 60/729,823 entitled "POWER PROTECTION FOR VCM CONTROL LOOP IN HARD DISK DRIVE SERVO IC", filed Oct. 25, 2005, the entirety of which are incorporated herein by reference.

FIELD OF THE INVENTION

The present invention relates to hard disk drive (HDD) controllers, and more particularly to HDD servo IC's adapted to control a Voice Coil Motor (VCM).

BACKGROUND OF THE INVENTION

Almost all semiconductor components or devices have maximum allowed rating voltages. When the component is under the stress, such as above the maximum allowed rating voltage, it can cause permanent damage to the component or devices, such as a VCM predriver and driver. On supply power-up, or even under the normal operation, a high voltage pulse can occur that could be as high as 25V from a 12V supply, which pulse could cause the voltage drain-source (VDS) of a power field effect transistor (FET) in a VCM circuit to exceed the maximum VDS of that process. If there is no power protection circuit, this high voltage pulse can damage the device.

There is desired improved circuitry configured to reduce the possibility of damage to VCM drive circuitry during power-up.

SUMMARY OF INVENTION

The present invention achieves technical advantages as a VCM power protection circuit that limits the maximum voltage that can occur across any of the VCM's output FETs during power-up or any time there is a higher than normal voltage on the power supply while at the same time providing some bias on the VCM output toward the landing zone.

DETAILED DESCRIPTION OF THE PRESENT INVENTION

Figure 1:
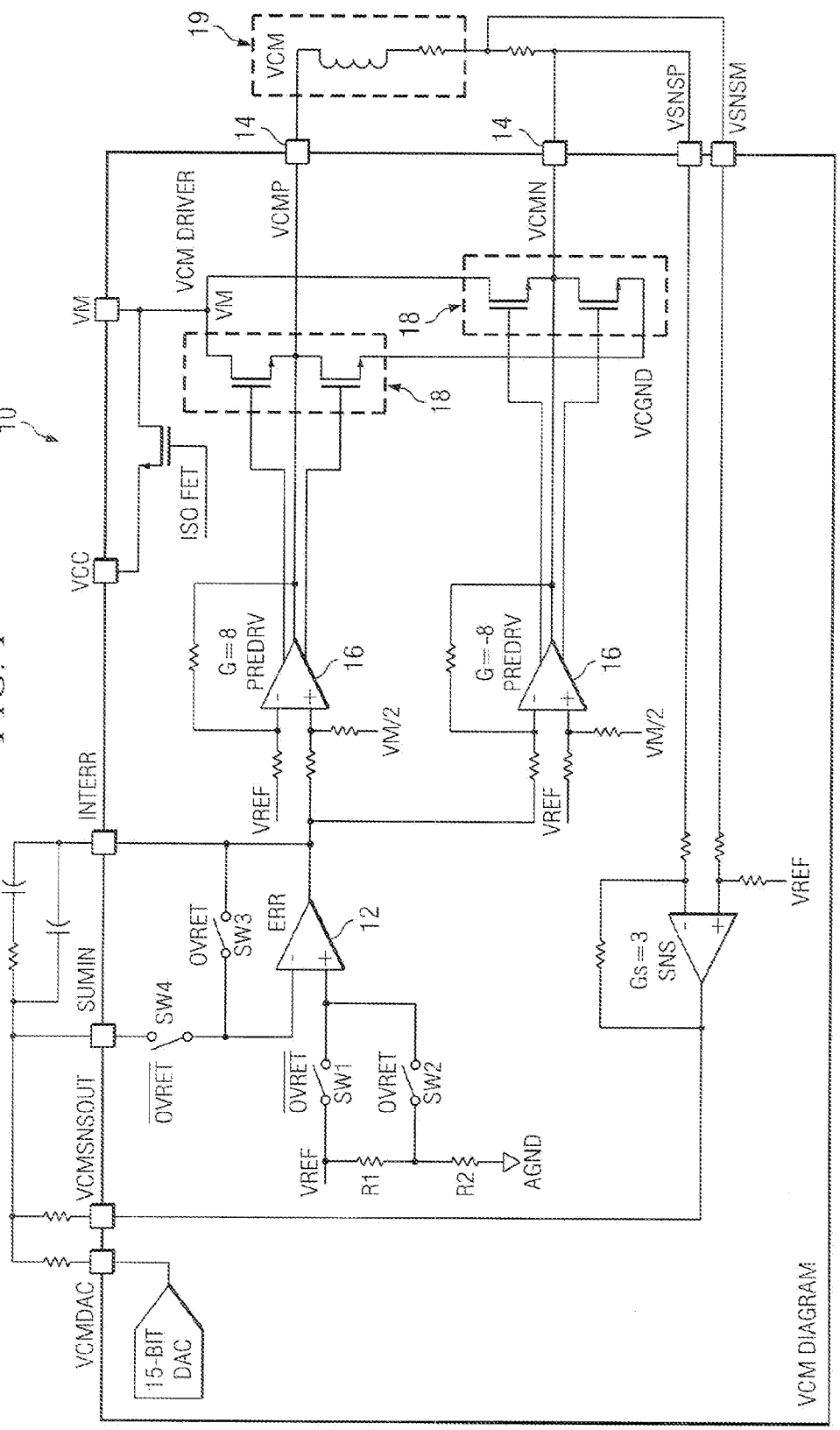
FIG. 1 is an electrical schematic diagram of a VCM driver circuit.

Referring now to FIG. 1, there is shown at 10 a VCM driver circuit adapted to control HDD head 19 according to one preferred embodiment of the present invention. Driver circuit 10 includes an error amplifier 12 driving a pair of predrivers 16, and a pair of FETs 18 driven by a respective predrivers 16. If an overvoltage of the positive voltage supply (VCC) or voltage motor voltage supply (VM) happens when the VCM circuit 10 is in normal operation, like tracking or seeking, the pre-driver circuit 10 biases the VCM bridges so that the positive drive voltage output VCMP will be 0.2 volts above half of supply VCC (½ VM) while the negative driver voltage output VCMN will be 0.2 volts below half of supply VCC. This driver circuit 10 limits the maximum voltage that can occur across any of the VCM's output FETs 18, while at the same time the driver circuit 10 provides some bias on the VCM output 14 to direct the HDD head 19 toward the landing zone.

When an overvoltage condition is detected, the driver circuit 10 changes the VCM error amplifier 12 from an integrator circuit configuration to a unity gain configuration by responsively closing the two switches SW2 and SW3, and by opening the two switches SW1 and SW4. The reference voltage to the error amplifier 12 is also changed from the reference voltage (VREF) to K*VREF voltage. K=R2/(R1+R2) where resistor R1 is between voltage VREF and switch SW2, and resistor R2 is between switch SW2 and analog ground (AGND). Therefore, the output voltage of error amplifier 12 is K*VREF, and the output voltages at output 14 of the pre-driver circuit 10 is:

$$VCMP=VM/2+gain*(VREF-Vinterr)=VM/2+gain*(1-K)*VREF=VM/2+0.2V$$

$$VCMN=VM/2-gain*(VREF-Vinterr)=VM/2-gain*(1-K)*VREF=VM/2-0.2V$$

In one preferred embodiment, the gain for the VCM predriver 10 is 8, and voltage VREF is 1.65V, so K is chosen as 65/66.

Figure 2:
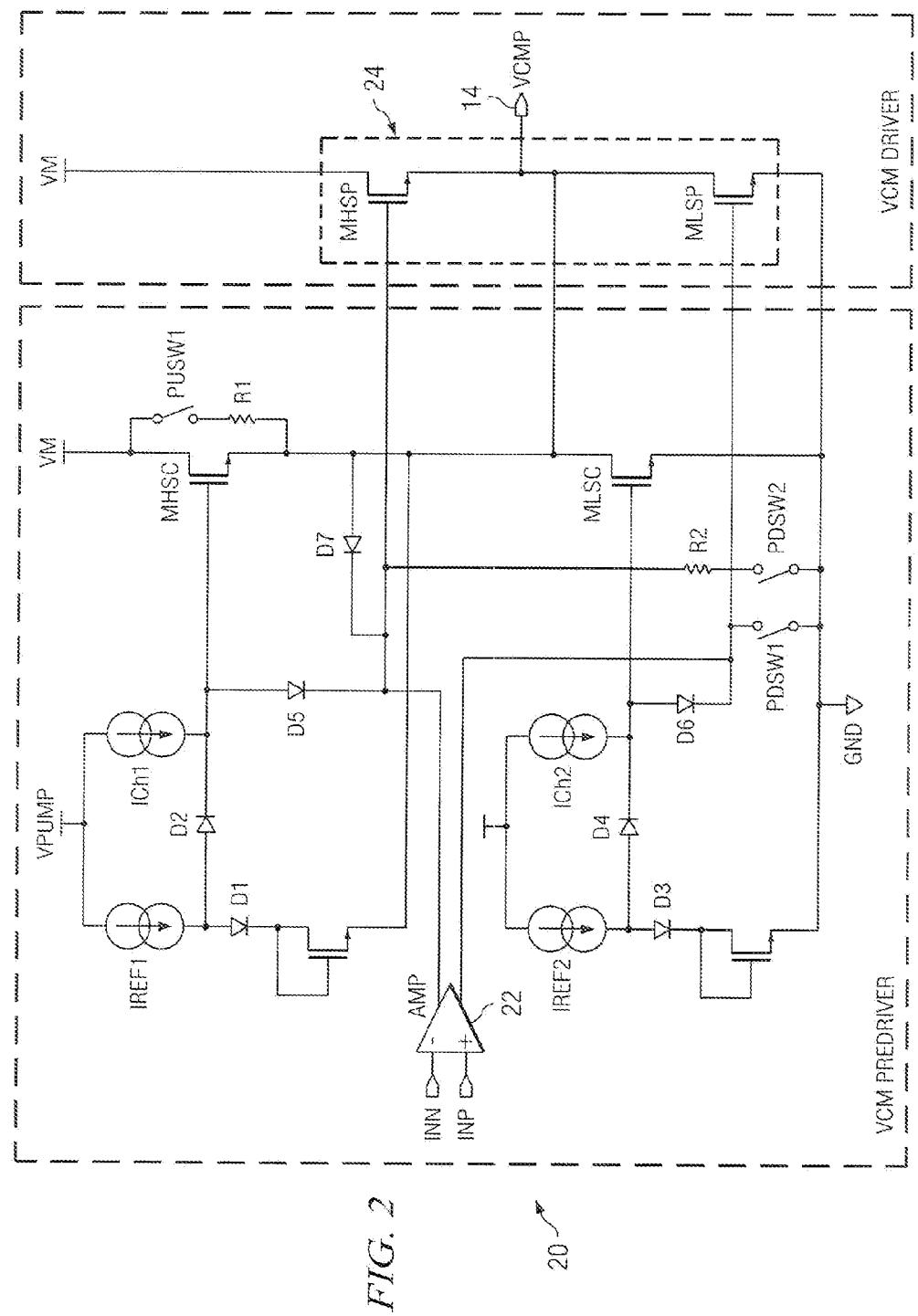
FIG. 2 is an electrical schematic diagram of one side of a VCM driver circuit. Two of these sides can be combined to form a full driver.

Referring now to FIG. 2, there is shown at 20 a VCM driver according to another preferred embodiment of the present invention having an pre-driver amplifier 22 and output FETs 24 providing a positive head voltage at 14. A similar circuit 20 providing VCMN is implied as shown in FIG. 1 but not drawn. If the overvoltage of the supply voltage VM happens during supply power-up, the driver circuit 20 biases the VCM bridge so that both HDD head voltages VCMP and VCMN will be around half of the VM supply (VM/2). During power-up, the VCM loop is not enabled, namely, both the VCM predriver and the driver circuit 20 are in sleep mode, so the voltages on VCMP and VCMN are determined by the additional circuitry consisting of resistors and diodes in the VCM predriver as shown.

When an overvoltage is detected, the driver circuit 20 of FIG. 2 turns on the switches PDSW1, PDSW2 and PUSW1. Advantageously, since the driver circuit 20 is in sleep mode, there is no bias current and pre-driver amplifier 22 is not working. After turning on those three switches, the four power FETs, namely, MHSC, MLSC, MHSP, and MLSP are turned off, and the voltage of VCMP is determined by resistors R1 and R2, and by the diode D7 voltage drop. By adjusting the two resistors, voltage VCMP can be set to around VM/2 volts, and voltage VCMN can be controlled in the same way.

The present invention derives technical advantages because first, other solutions can't protect the device if the overvoltage of the power supply happens during power-up, or if the VCM loop is not enabled. Second, one conventional solution biases output voltage VCMP at VM/2+0.5V and output voltage VCMN at VM/2−0.5V. This conventional solution also uses resistors to generate the reference voltage. However, instead of using the error amplifier in a unity gain configuration to buffer the reference signal and send it to the pre-driver directly, it uses NPN and PNP devices to level shift the signal while buffering it, and that buffered reference signal connects to the VCM pre-driver through one switch. Since the matching between the NPN and PNP devices is not good, and as voltage VM increases, the current flowing back into the PNP device and the switch increases. Therefore, this conventional solution can't keep VCMP at VM/2+0.5V and VCMN at VM/2−0.5V at VM changes. This conventional solution has the additional problem that at some process corners the VCMN voltage is higher than the VCMP voltage, which could damage the disk.

The present invention further achieves technical advantages by protecting the HDD device regardless of whether the VCM loop is enabled or disabled. Further, if the VCM is enabled, the present invention accurately sets the VCMP voltage at about VM/2+0.2V and VCMN at VM/2−0.2V as VM changes, so the polarity of the voltage difference between VCMP and VCMN is always positive. This guarantees the VCM head will move to the landing zone, and so the disk will not be damaged. Moreover, less circuitry is used and this saves silicon area.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A control circuit for a VCM, comprising:
   a pre-driver circuit having an error amplifier circuit inducing a VCM control loop and operating from a supply VM, the pre-driver circuit and configured to provide a first output; and
   a driver circuit receiving the pre-driver circuit first output and configured to provide a second output adapted to drive an HDD head,
   wherein the VCM control loop is configured to have multiple operating states.

2. The control circuit as specified in claim 1 wherein the error amplifier circuit is electronically configurable as a unity gain amplifier, and as an integrator circuit.

3. The control circuit as specified in claim 2 wherein the pre-driver circuit is adapted to respond to an over-voltage condition.

4. The control circuit as specified in claim 3 wherein the error amplifier circuit is configured to be established as an integrator circuit when the over-voltage condition is not detected.

5. The control circuit as specified in claim 4 wherein the error amplifier circuit is configured to be established as a unity gain amplifier when the over-voltage condition is detected.

6. The control circuit as specified in claim 1 wherein the second output is a positive voltage when the control circuit is operating in an over-voltage condition.

7. The control circuit as specified in claim 6 wherein the positive voltage is sufficient to move an HDD head toward a parked position.

8. The control circuit as specified in claim 7 wherein the second output is configured to be about VM/2 when the control circuit is in operation and when the over-voltage condition occurs.

9. The control circuit as specified in claim 8 wherein the output voltage is about VM/2+/−0.2 volts when the control circuit is in operation and when the over-voltage condition occurs.

10. The control circuit as specified in claim 1 wherein the output voltage is about VM/2 when the control circuit is in a sleep mode and the over-voltage condition occurs.

11. The control circuit as specified in claim 1 wherein the error amplifier circuit includes an amplifier driving an output stage.

12. The control circuit as specified in claim 11 wherein the output stage comprises a pair of NMOS FETs.

13. The control circuit as specified in claim 11 wherein the output stage comprises a pair of predriver amplifiers.

14. The control circuit as specified in claim 13 further comprising a first pair of transistors driven by a first said prederiver amplifier, and a second pair of transistors driven by a second said predriver amplifier.

15. The control circuit as specified in claim 14 wherein the first pair of transistors comprise two FETs, one said FET having a drain connected at a node to a source of the other said FET.

16. The control circuit as specified in claim 15 wherein the second output is provided at said node.

* * * * *